Figure 2:
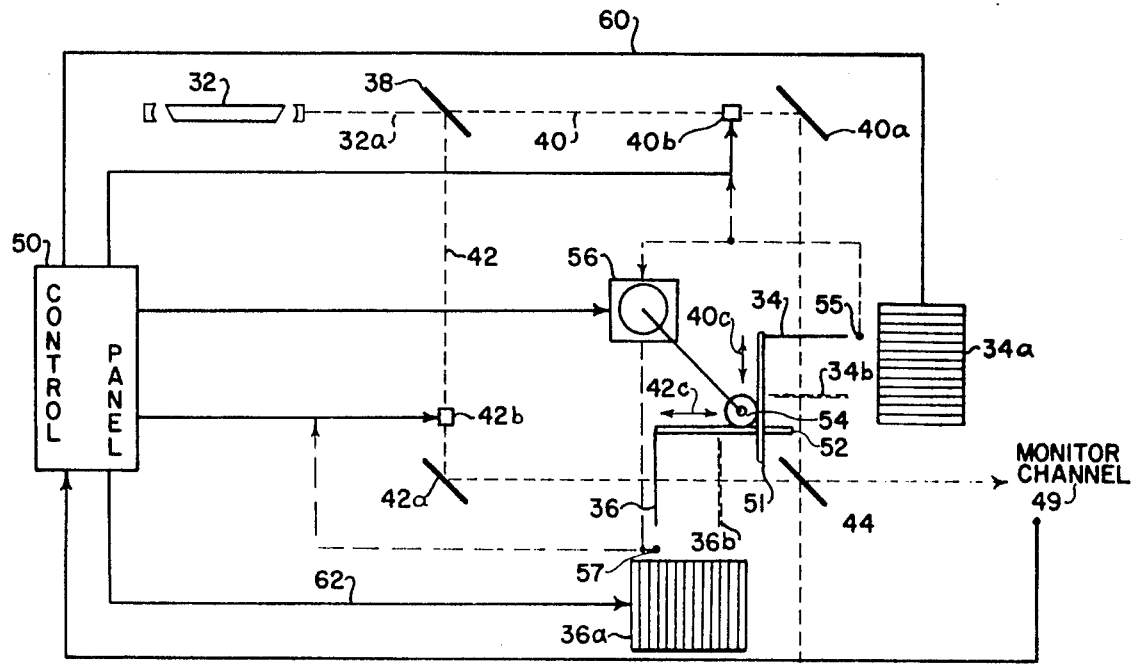

//233    OR    3,600,055

United States P... A 350-3,7    3,600,055

[72] Inventors Robert M. Emerick
 El Segundo, Calif.;
 James A. Horton, Munroe Falls, Ohio
[21] Appl. No. 877,315
[22] Filed Nov. 17, 1969
[45] Patented Aug. 17, 1971
[73] Assignee Goodyear Aerospace Corporation
 Akron, Ohio

[54] HOLOGRAPHIC FLIGHT SIMULATOR
 3 Claims, 2 Drawing Figs.
[52] U.S. Cl. .................................................. 350/3.5,
 35/12 N
[51] Int. Cl. ............................................. G02b 27/00
[50] Field of Search ...................................... 350/3.5;
 35/12 N

[56] References Cited
 UNITED STATES PATENTS
 3,367,046 2/1968 Neuberger .................. 35/12
 3,435,452 3/1969 Kilpatrick .................. 350/3.5
 3,517,122 6/1970 Owen ......................... 35/12
Primary Examiner—David Schonberg
Assistant Examiner—Ronald J. Stern
Attorneys—J. G. Pere and L. A. Germain ABSTRACT: The invention provides real time simulation techniques based on the use of holographic data storage. It possesses all of the advantages of a three-dimensional model optical pickup simulator and almost none of the disadvantages. The use of holograms eliminate the need for large models and associated structures. Coherent light and a plurality of channels, each channel controllable, and each channel adapted to receive separate holograms arranged in appropriate sequence to give simulation of motion in any of 6° of movement comprise the structural embodiment.

PATENTED AUG 17 1971　　3,600,055

INVENTORS
JAMES A. HORTON
ROBERT M. EMERICK
BY: Oldham & Oldham
ATTORNEYS

HOLOGRAPHIC FLIGHT SIMULATOR

Heretofore, it has been known that the use of visual simulation techniques have pretty definitely required some actual models with the associated problems of maintaining the models and providing illumination thereof being a constant trouble spot. Further, because of the actual physical limitations of the models, actual simulation with respect to movement therearound by a pickup device is sometimes difficult.

Therefore, the general object of the invention is to provide real time simulation techniques based on the use of holographic data storage that possesses all the advantages of a three-dimensional model optical pickup simulator and almost non of the disadvantages. Once the holograms have been made, there is no need for the large models in associated structures. Many operational and maintenance problems such as model illumination requirements are eliminated. Space requirements for an operable system are a small fraction of its model-pickup counterpart.

The objects of the invention are achieved by providing a simulation system which comprises a coherent light source, means to produce at least two channels for receiving and using the light source, means to selectively control light passage through each channel, a plurality of holograms made normal to a model plane and at various intervals along the model associated with each channel, means to selectively position a hologram into each channel, and means to effect a visual display of the coherent light output of each channel.

Figure 1:
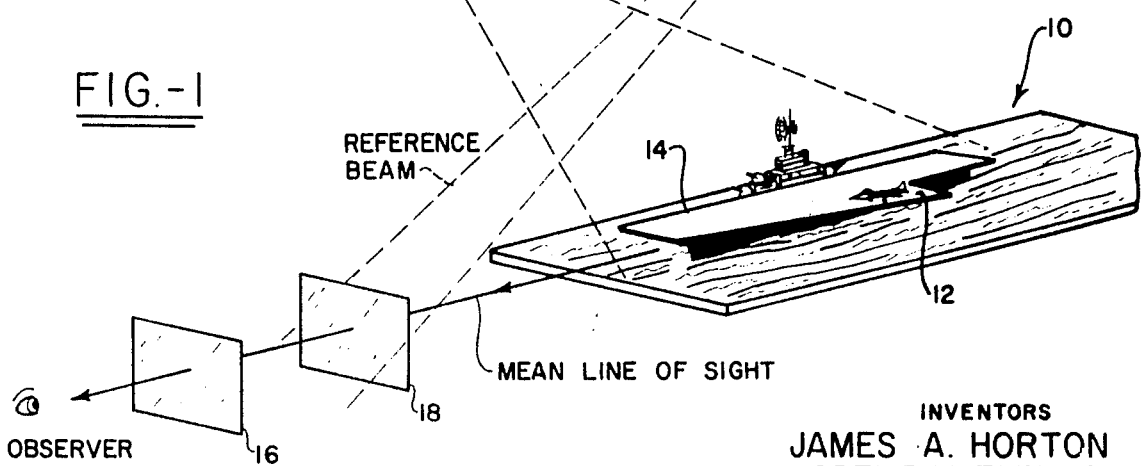

For a better understanding of the invention reference should be had to the accompanying drawings wherein:

FIG. 1 is an illustration of the preferred technique to generate the holograms for use with the invention; and FIG. 2 is a schematic illustration of a sample system that uses the holograms generated according to FIG. 1.

Fundamentally, the system requires a series of holograms of a three-dimensional model although holograms of three-dimensional objects have been made by computer techniques for objects that do not actually exist.

HOLOGRAM GENERATION

The production of three-dimensional holograms is known. The invention contemplates that a plurality of these holograms will be made of the same model with the holograms generally made normal to the mean line of sight and at various intervals from the model. As an example of how to make the holograms, reference should be had to FIG. 1 where the model is indicated generally by numeral 10 and comprises a pair of runways 12 and 14. The holograms are generated on photographic material or sheets 16 and 18, respectively. Light from a laser 20 is split into two or more beams by an appropriate beam splitter 22. A first beam 24 directly illuminates the photographic material 16 or 18 and is called a reference beam. The other laser beams, only one of which is indicated by numeral 26, are used to illuminate the subject three-dimensional model 10. Light-reflected from the model is recorded on the photographic material 16 and 18 with a resultant interference pattern unique to the model. When the exposed film 16 and 18 is suitably processed depending upon the nature of the film, and the model and all beams except the reference are removed, an observer looking through one of the holograms formed by film 16 and 18 will see a three-dimensional virtual image of the model. Observation is only restricted in the sense that the virtual image must be viewed through the hologram. It is for this reason that an observer wishing to more closely approach the model reaches a limit when his eye is at the hologram.

To overcome this problem, a plurality of holograms are developed along the plane of the model, only two of which are illustrated by numeral 16 and 18 in FIG. 1. Hence, once the eye of the observer approaches adjacent hologram 16, for example, it is removed and hologram 18 is viewed in place thereof. It is important to note that the model image appears identical to an observer for a given position regardless of whether he is viewing the model image trough either hologram 16 or 18. Therefore, when a mechanical limit (observation point on the surface of the hologram) is reached, it is only necessary to remove the limiting hologram and replace it with another closer to the object. The observation point can then be freely moved until a limit is again reached in which case the process is repeated. Spacing between the holograms can be selected to insure that little, if any, field of view will be lost when changing from one hologram to another. It should also be noted that holograms may be flat or curved and their size on the order of feet, with the size limit imposed by the size of the photographic material and the coherence length of the laser. Coherence lengths of several meters are conventionally possible today.

STRUCTURAL APPROACH

A structural implementation of a simulation device utilizing the holograms generated according to the provisions of FIG. 1 is shown in FIG. 2. The basic equipment required is an optical pickup device 30, a laser 32 and holograms 34 and 36. The holograms are one of a series carried by appropriate storage compartments 34a and 36a respectively. The laser 32 generates a beam 32a that passes through a beam splitter 38 to two separate channels 40 and 42, respectively. Each of the channels 40 and 42 has an appropriate mirror 40a and 42a which direct both channels to a second beam splitter 44 positioned in cooperative arrangement with the lens 46 and optical pickup 30. Any suitable mechanical means indicated by block 31 can be utilized to provide movement of the pickup 30 in the X,Y, roll, pitch and yaw directions. For example, a joy stick 33 and foot controls 35 might operate through control block 31 to effect movement of the pickup 30. Each of the channels is respectively provided with an appropriate light switch 40b and 42b to control the coherent light transmission through the channel.

The objects of the invention are achieved by positioning the holograms 34 and 36 in the respective channels with mechanical apparatus associated therewith to effect movement in the plane of the channel or in the Z direction as indicated by double-ended arrows 40c and 42c, respectively. The dotted line position 34b and 36b indicate the Z direction of movement that the holograms might take. The structure includes a rack 51 connected to hologram 34 and a rack 52 connected to hologram 36, these cooperating with a gear 54 driven by a motor 56. The motor 56 is controlled by panel 50 and it can be seen by the mechanical interrelation of the racks 51 and 52 with gear 54, that the holograms 34 and 36 will always be driven in opposite, but synchronized relation to each other.

The channels 40 and 42 are viewed one at a time by controlling the laser beam illumination through an appropriate control panel 50. Simulated movements in the Z direction in opposite synchronism are made by moving the holograms 34 and 36, again by actuation through control panel 50. When the limit on movement of one hologram has been reached, the illumination is switched to a second channel which is appropriately controlled to have the proper hologram in position so that complete continuity is provided. The hologram in this channel now provides additional Z axis motion. At the moment the channels are switched, the images produced by both channels are identical and synchronized because of the mechanical interrelation.

In the beam splitter arrangement shown, a monitoring channel 49 can be provided through beam splitter 44 to feed back to the control panel 50 for transmission to any desired location. The switching occurs when both channels are identical. Also, the beam splitter arrangement with the monitoring channel can be set up with a different colored laser to track both images simultaneously. Channel switching is preferably automatically accomplished by having each hologram 34 and 36 actuate a microswitch 55 or 57 respectively, or the like, when the limit of its travel has been reached, causing a reversal of motor 56 and a switching of the optical channel being viewed.

The panel 50 also controls a change in holograms, from compartments 34a and 36a, this being indicated schematically by lines 60 and 62.

While in accordance with the patent statutes only one best known embodiment of the invention has been illustrated and described in detail, it is to be particularly understood that the invention is not limited thereto or thereby, but that the inventive scope is defined in the appended claims.

What we claim is:

1. A simulation system comprising:

a light source for projecting a coherent light beam;

means for dividing the light beam into at least two separate channels;

means for selectively controlling light passage along each channel;

a hologram position in each channel;

means for moving the hologram along the path of travel of the light beam of the respective channel, the movement being between first and second end positions;

means for actuating the light passage controlling means in response to hologram position whereby the hologram of one channel is illuminated as the hologram moves between its first and second end positions, illumination is removed from the hologram of the one channel when that hologram has reached the second end position, and a hologram of a second channel is simultaneously illuminated, the last-mentioned hologram being at the first end position of movement in its respective channel;

the hologram of the second being generated along the same line of sight to an object as the hologram of the first channel, the separation between the respective points of generation being such that the image received by the optical pickup means from the hologram of the first channel when said hologram is at its second end position is identical to the image received from the hologram of the second channel when said hologram is at its first end position;

means for directing the image generated by the hologram of each channel to a common channel;

optical pickup means receiving the image directed along the common channel to effect a visual display thereof;

means to effect movement of the optical pickup in $x,y$, roll, yaw and pitch directions while viewing the coherent light received from each respective channel;

a rack associated with each channel, means to drive the racks in opposite phased synchronism to each other, and means to have each rack carry a hologram in properly oriented relation to its respective channel; and a monitor channel associated with each channel, a control panel to selectively actuate each channel, and means to feed the information received by the monitor channel back to the control panel.

2. A simulation system according to claim 1 which includes a beam splitter associated with each monitor channel.

3. A system according to claim 1 which includes a microswitch associated with each rack actuated upon a predetermined movement of its rack to effect reversal of the means to drive the racks.